June 7, 1949.                    J. W. DAWSON                    2,472,095
                            RESISTANCE WELDING SYSTEM Filed Sept. 10, 1940                                         2 Sheets-Sheet 1

INVENTOR.
JOHN W. DAWSON,
BY [signature]
    ATTY.

Patented June 7, 1949

2,472,095

UNITED STATES PATENT OFFICE 2,472,095

RESISTANCE WELDING SYSTEM

John W. Dawson, Auburndale, Mass., assignor to Raytheon Manufacturing Company, Newton, Mass., a corporation of Delaware Application September 10, 1940, Serial No. 356,146

30 Claims. (Cl. 219—4)

This invention relates to a system in which energy stored primarily in an inductance is delivered to a resistance welding load. Heretofore systems of this kind have involved the use of circuit-breaking means for interrupting the flow of current to the exciting winding of the inductance, with the consequent production of energy-consuming arcs. Such systems have also had the drawback of being erratic in operation and generating an output wave shape which cannot be controlled with fidelity.

An object of this invention is to devise a system of the foregoing type in which the energy which is stored in the inductance is delivered to the welding load without any loss of said energy.

Another object is to provide said inductance in the form of a transformer and to commutate the current out of the primary thereof by means of current supplied to the secondary winding.

Another object is to interrupt the flow of current in the exciting winding of the inductance without the production of any energy-consuming arcs.

A further object is to accomplish the foregoing interruption by supplying the interruption energy from a condenser.

A further object is to device a resistance welding system in which electrostatic and magnetic energy storage means are utilized to supply a single pulse of welding current.

A still further object is to provide for substantially exponential decay of the welding current.

An additional object is to devise a system of the foregoing type which is simple, reliable and easy to control.

The foregoing and other objects of this invention will be best understood from the following description of an exemplification thereof, reference being had to the accompanying drawing, wherein.

Figure 1:
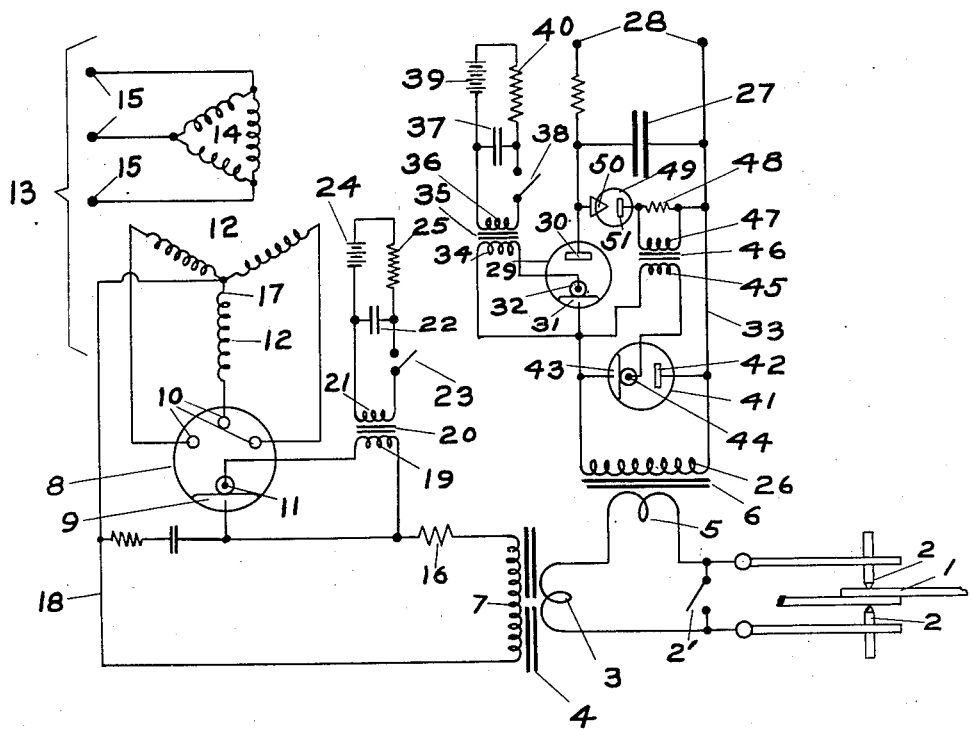
Fig. 1 is a diagrammatic representation of a system embodying my invention.

In the system illustrated in Fig. 1, a piece of work 1 to be welded is operated upon by a pair of welding electrodes 2 which are adapted to move into and out of contact with said work. The welding electrodes are adapted to be supplied with energy from a secondary winding 3 of a welding transformer 4 connected in series with a secondary winding 5 of an auxiliary transformer 6. A switch 2' is connected across welding electrodes 2. The welding transformer 4 is provided with a primary winding 7 adapted to be supplied with rectified current from a rectifier tube 8. Tube 8 is preferably of the controlled ignition type having a mercury pool cathode 9 and a plurality of anodes 10. In order to initiate a discharge in the tube 8, the pool cathode 9 is provided with an igniter 11, preferably of the electrostatic type. The anodes 10 are connected respectively to the outer ends of three secondary windings 12, connected in star, of a transformer 13 having a primary winding 14 energized from a plurality of terminals 15 which are adapted to be connected to some suitable source of three-phase alternating current. The cathode 9 is connected through a current-limiting resistance 16 to one side of the primary winding 7. The neutral point 17 of the secondary windings 12 is connected through a conductor 18 to the other side of said primary winding 7. The current which flows through the primary winding 7 stores magnetic energy in the core of the transformer core. In order to prevent said core from becoming saturated and also to increase the amount of such stored magnetic energy, said core is preferably provided with an air gap.

In order to provide the electrostatic igniter 11 with igniting impulses, a secondary winding 19 of an igniting transformer 20 is connected between the igniter 11 and the cathode 9. The igniting transformer 20 is provided with a primary winding 21 adapted to be supplied with a pulse of current from the condenser 22 which is charged from a suitable source of current, such as a battery 24, through a resistance 25. A switch 23 is interposed between the condenser 22 and the primary winding 21.

The auxiliary transformer 6 is provided with a primary winding 26 which is adapted to be supplied with current-interrupting energy from a condenser 27 which is adapted to be charged from some suitable source of direct current connected to terminals 28. The connection of the condenser 27 to the primary winding 26 is made through a controlled ignition tube 29 having an anode 30 and an arc cathode 31, preferably of the mercury pool type. Said arc cathode is provided with an igniter 32, preferably of the electrostatic type. The anode 30 is connected to the positive side of the condenser 27, while the cathode 31 is connected to the left side of the primary winding 26. The negative side of the condenser 27 is connected through a conductor 33 to the right side of the primary winding 26.

In order to supply the igniter 32 with pulses of igniting current, the secondary winding 34 of an igniting transformer 35 is connected between the igniter 32 and its cathode 31. The igniting transformer 35 is provided with a primary winding 36 adapted to be supplied with energy from a condenser 37 by means of a switch 38. The condenser 37 is adapted to be charged from a suitable source of current, such as a battery 39, through a current-limiting resistance 40.

A shunt tube 41 is connected across the primary winding 26. This shunt tube contains an anode 42 and an arc type cathode 43, preferably of the mercury pool type. Said cathode 43 is provided with an igniter 44, also preferably of the electrostatic type. In order to energize the tube 41 at the proper time in the operation, a secondary winding 45 of an igniting transformer 46 is connected between the igniter 44 and the cathode 43. The igniting transformer 46 is provided with a primary winding 47 connected across a resistance 48 which is connected in series with a rectifier tube 49 across the terminals of the condenser 27. The rectifier tube 49 has a cathode 50 of the permanently-energized type, such as a thermionic filament, and an anode 51.

Figure 2:
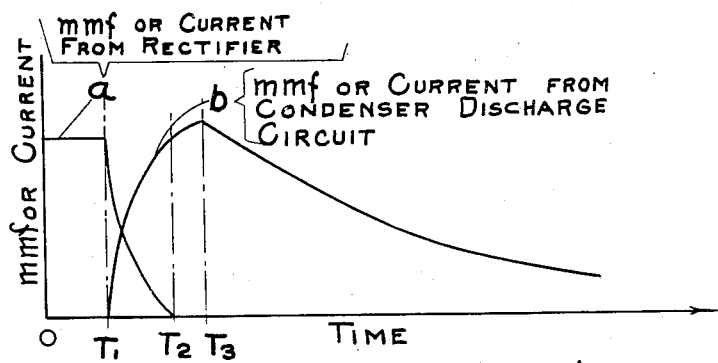
Fig. 2 is a set of curves illustrating the mode of operation of the arrangement shown in Fig. 1.

The operation of the system described above will be understood more clearly in connection with Fig. 2, in which time is plotted along the horizontal axis and magnetomotive force or current is plotted along the vertical axis. The curve $a$ represents the magnetomotive force impressed upon the core of transformer 4 by the primary winding 7. To a different scale this curve can likewise represent the amount of current flowing in said primary winding. The curve $b$ represents the magnetomotive force which is impressed on the core of transformer 4 by means of the secondary winding 3 during the discharge of condenser 27. To a different scale this curve can likewise represent the current flowing in said secondary winding 3 as a result of the discharge of the condenser 27, and thus this curve can represent the current flowing in the welding load.

Before the system is set in operation, the electrodes 2 are withdrawn from the work 1 so as to leave the circuit through the welding electrodes 2 open. The switch 2' is likewise maintained in its opened position. To initiate the operation of the system, the switch 23 is closed, thus supplying an igniting impulse to the igniter 11 and initiating a discharge in the rectifier tube 8. This tube thereupon delivers rectified current to the primary winding 7, which finally reaches a relatively steady value such as represented by the curve $a$ at time 0. Actually this current may have ripples in it, but it is represented as a steady value of direct current for purposes of illustration. The current thus flowing represents a certain value of flux which has been built up in the core of transformer 4, which likewise involves the storing in this core of a predetermined amount of energy originally derived from the terminals 15. After the flow of current $a$ has been established at its substantially steady value, the switch 2' is closed, the electrodes 2 are brought into contact with the work 1, and then the switch 2' is reopened. The purpose of the switch 2' and the sequence of operations recited are for the purpose of avoiding any undesirable sparking at the electrodes 2, due to the presence of ripples in the current $a$ which might tend to generate spark-producing voltages in the secondary winding 3.

Thereafter, at the time $T_1$, the switch 38 is closed, initiating a discharge in the tube 29 and causing the previously charged condenser 27 to discharge into the primary winding 26. The discharge current from the condenser 27 builds up, and produces a similar flow of current $b$ in the secondary winding 3 through the intermediary of the auxiliary transformer 6. This current flowing in the secondary winding 3 supplies a magnetomotive force to the core of the transformer 4 which is in the same direction as that supplied by the current flowing in the primary winding 7. The flow of current $b$ in the secondary winding 3 creates a back electromotive force which opposes the flow of current in the primary winding 7, and likewise opposes the voltage impressed across the rectifier tube 8, tending to maintain conduction therein. The net result is that the magnetomotive force impressed upon the core of transformer 4 remains substantially constant except for the slight change necessary to generate the back E. M. F. for producing the necessary change in the current flowing through the primary winding 7. Therefore the current $a$ through the primary winding 7 falls off between the times $T_1$ and $T_2$ inversely as the current $b$ builds up. At the time $T_2$, the current through the primary winding 7 falls substantially to zero, at which time the discharge through the tube 8 is extinguished. When the discharge in the tube 8 is extinguished, the arc spot on the cathode 9 goes out and a discharge cannot be reinitiated in the tube 8 until a new igniting impulse is supplied to the igniter 11 by reclosing of the switch 23. The discharge of the condenser 27 may continue to boost the current $b$ slightly until said current reaches its maximum value and tends to decrease. At this time the voltage across the condenser 27 will have dropped to zero and will tend to reverse. Such reversal of voltage will send a pulse of current through the rectifier tube 49, delivering an igniting impulse to the igniter 44. This initiates a discharge in the tube 41, and thus establishes a shunt circuit across the primary winding 26. This shunt circuit causes the welding current to decrease substantially exponentially. The energy represented by this decreasing current is derived primarily from the collapse of flux in the core of the transformer 4. The action of such a shunt circuit upon the welding current is more fully described and claimed in my copending application, Serial No. 309,124, filed December 14, 1939.

The foregoing operation is secured with relatively small condensers. I have found that in a system in which the foregoing action is produced, $\frac{1}{2}CV^2$ roughly equals $\frac{1}{2}L_2I_2$, in which C is the capacity of the condenser 27, V is the voltage to which the condenser is originally charged, $L_2$ is the inductance of the circuit of the electrodes 2, and $I_2$ is the maximum current flowing through the electrodes 2 during the welding operation. By having $L_2$ relatively small, the condenser $c$ can likewise be relatively small.

Figure 3:
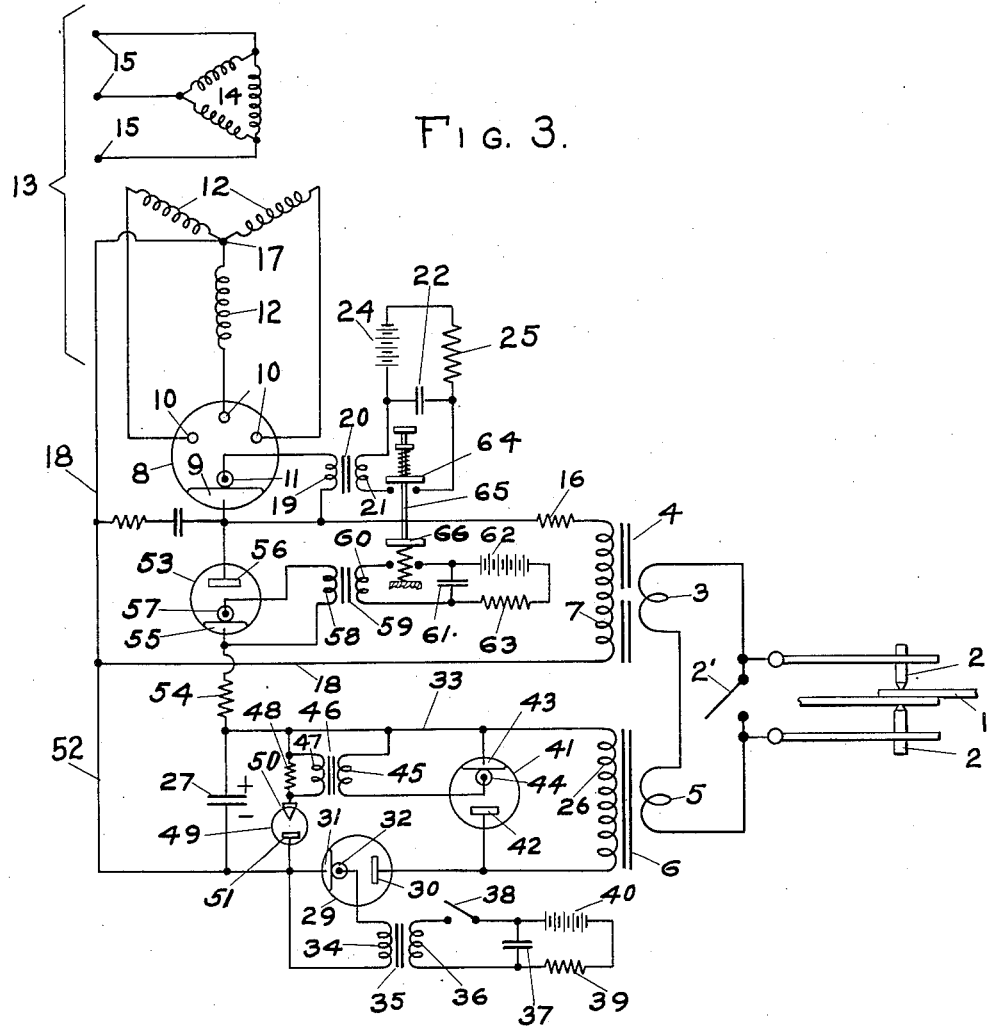
Fig. 3 is a diagrammatic representation of a modification of the system shown in Fig. 1.

Instead of utilizing a separate source 28 to charge the condenser 27, as illustrated in Fig. 1, the rectifier 8 may be made to serve this purpose as well as its function as described in connection with Fig. 1. Such an arrangement is shown in Fig. 3 in which the same reference numerals are applied where the elements are identical with those in Fig. 1. In Fig. 3 one side of the condenser 27 is connected directly by means of a conductor 52 to the negative lead 18 of the rectifying system formed by the tube 8 and its associated circuit. The positive side of said rectifying system, which constitutes the lead connected to the cathode 9, is connected through a controlled discharge tube 53 and a current-limiting resistance 54 to the other side of said condenser 27. The tube 53 is preferably similar to tubes 29 and 41, and is provided with a pool type cathode 55, an anode 56, and an igniter 57 similar to the igniters 11, 32 and 44. It will be noted that the polarity of the condenser 27 in Fig. 3 is reversed with respect to the polarity of said condenser, as shown in Fig. 1. For this reason the polarities of the tubes 29 and 41 have likewise been reversed. However, aside from this change, the circuit in connection with said tubes 29 and 41 is identical with that shown in Fig. 1.

The igniter 57 is adapted to be supplied with igniting impulses from the secondary winding 58 of an igniting transformer 59 having a primary winding 60. Said primary winding is likewise adapted to be supplied with a pulse of igniting current from a condenser 61 which is charged from a suitable source of energy, such as a battery 62 in series with a resistance 63. The switch 23 in the igniting circuit of igniter 11 in Fig. 1 is replaced in Fig. 3 by an armature 64 of a pushbutton switch 65. Said switch 65 likewise carries an armature 66 which is adapted to connect the charged condenser 61 to the primary winding 60 for the purpose of supplying the igniting impulse to the igniter 57. The armature 64 is preferably spring-mounted on the switch 65 so that, upon actuation of the switch 65, said armature 64 engages its associated contacts before the armature 66 engages its associated contacts, whereby the tube 8 is ignited just prior to the ignition of tube 53.

The operation of the system illustrated in Fig. 3 is substantially as follows. Upon the actuation of the switch 65, the armature 64, closing its associated circuit, causes the tube 8 to be ignited and to supply current to the primary winding 7, as described in connection with Fig. 1. Immediately upon the start of a discharge in tube 8, igniter 57 is supplied with an igniting impulse, due to the engagement of armature 66 with its associated contacts, as described above. Since the tube 8 is at this time in its conducting condition, the voltage delivered by said tube 8 will be impressed across the tube 53 in series with the resistance 54 and the condenser 27. Thus a discharge will be initiated in the tube 53 and charging current will flow to the condenser 27. When the condenser 27 is charged substantially to the voltage delivered by the rectifier tube 8, the current flowing through the tube 53 will drop to such a low value that the discharge in tube 53 will be extinguished. This effectively opens the circuit between the rectifier 8 and the condenser 27, so that said condenser 27 and its associated circuit are effectively released from the circuit of the tube 8 and the primary winding 7. It will be seen that the tube 53 will not restart unless the switch 65 is released and again actuated. However, such release and actuation do not take place until the completion of a complete welding operation. When the condenser 27 has been charged to a predetermined value, as described above, the switch 38 is closed, whereupon the action of the condenser 27 in stopping conduction of current to the primary winding 7 and causing delivery of energy to the welding load 1 ensues exactly as described in connection with Fig. 1. In Fig. 3 the operation of the switch 2' is carried out in the same way as described in connection with Fig. 1.

Of course it is to be understood that this invention is not limited to the particular details as described above inasmuch as many equivalents will suggest themselves to those skilled in the art. For example, instead of using ignition tubes of the type as described above, other types of controlled discharge tubes, such as grid-controlled thermionic cathode rectifiers, could be utilized. Likewise other arrangements for supplying igniting impulses in the proper relation and sequence to the various control elements could be devised. Other changes and modifications will readily suggest themselves to those skilled in the art. It is accordingly desired that the appended claims be given a broad interpretation commensurate with the scope of the invention within the art.

What is claimed is:

1. In combination, an inductance, a load circuit operatively related thereto, means for supplying a magnetomotive force to said inductance to store energy in said inductance by setting up magnetic flux, means for supplying an auxiliary magnetomotive force to said inductance to maintain said flux and for simultaneously cutting off said first-named magnetomotive force, and means for causing said auxiliary magnetomotive force to decrease to cause collapse of said flux and delivery of said energy to said load circuit.

2. In combination, an inductance comprising windings, a load circuit operatively related thereto, means for supplying a magnetizing current to said windings to store energy in said inductance by setting up magnetic flux, means for supplying an auxiliary current to said windings to maintain said flux and for simultaneously cutting off said first-named current, and means for causing said auxiliary current to decrease to cause collapse of said flux and delivery of said energy to said load circuit.

3. In combination, a source of current, an inductance comprising windings, a load circuit operatively related thereto, a controlled discharge tube energized from said source of current for supplying a magnetizing current to said windings to store energy in said inductance by setting up magnetic flux, means for supplying an auxiliary current to said windings to maintain said flux and for simultaneously decreasing said first-named current to a low value, said discharge tube being adapted to cease conduction and supply of current upon decrease of said first-named current to said low value, and means for causing said auxiliary current to decrease to cause collapse of said flux and delivery of said energy to said load circuit.

4. In combination, a source of alternating current, an inductance comprising windings, a load circuit operatively related thereto, a controlled discharge rectifier tube energized from said source of current for supplying a magnetizing current to said windings to store energy in said inductance by setting up magnetic flux, means for supplying an auxiliary current to said windings to maintain said flux and for simultaneously decreasing said first-named current to a low value, said discharge tube being adapted to cease conduction and supply of current upon decrease of said first-named current to said low value, and means for causing said auxiliary current to decrease to cause collapse of said flux and delivery of said energy to said load circuit.

5. In combination, an inductance comprising windings, a load circuit operatively related thereto, means for supplying a magnetizing current to said windings to store energy in said inductance by setting up magnetic flux, a condenser, means for charging said condenser, means for discharging said condenser for supplying an auxiliary current to said windings to maintain said flux and for simultaneously cutting off said first-named current, whereby the subsequent decrease of said auxiliary current causes collapse of said flux and delivery of said energy to said load circuit.

6. In combination, an inductance comprising windings, a load circuit operatively related thereto, means for supplying a magnetizing current to said windings to store energy in said inductance by setting up magnetic flux, a condenser, means for charging said condenser, means for discharging said condenser for supplying an auxiliary current to said windings to maintain said flux and for simultaneously cutting off said first-named current, and means for establishing a low impedance closed circuit coupled to said load circuit upon substantial discharge of said condenser to cause the subsequent decrease of current in said load circuit to be impeded.

7. In combination, a first transformer having a magnetic core and a primary circuit and a secondary circuit, a load circuit connected to said secondary circuit, means for supplying magnetizing current to said primary circuit to store energy in said core by setting up magnetic flux, a second transformer having a primary circuit and a secondary circuit, the secondary winding of said second transformer being effectively coupled in series with the secondary winding of said first transformer, and means for supplying a pulse of current to the primary winding of said second transformer to set up an auxiliary magnetomotive force in said first transformer for maintaining said flux and simultaneously cutting off said magnetizing current, whereby upon subsequent decrease of said pulse of current of current said flux collapses and delivers said energy to said load circuit.

8. In combination, a first transformer having a magnetic core and a primary circuit and a secondary circuit, a load circuit connected to said secondary circuit, means for supplying magnetizing current to said primary circuit to store energy in said core by setting up magnetic flux, a second transformer having a primary circuit and a secondary circuit, the secondary winding of said second transformer being effectively coupled in series with the secondary winding of said first transformer, means for supplying a pulse of current to the primary winding of said second transformer to set up an auxiliary magnetomotive force in said first transformer for maintaining said flux and simultaneously cutting off said magnetizing current, and means for establishing a low impedance shunt circuit across said second transformer upon decrease of said pulse of current to cause corresponding decrease of current in said load circuit to be impeded.

9. In combination, a first transformer having a magnetic core and a primary circuit and a secondary circuit, a load circuit connected to said secondary circuit, means for supplying magnetizing current to said primary circuit to store energy in said core by setting up magnetic flux, a second transformer having a primary circuit and a secondary circuit, the secondary winding of said second transformer being effectively coupled in series with the secondary winding of said first transformer, a condenser, means for charging said condenser, means for discharging said condenser for supplying a pulse of current to said second transformer to set up an auxiliary magnetomotive force in said first transformer for maintaining said flux and simultaneously cutting off said magnetizing current, whereby upon subsequent decrease of said pulse of current said flux collapses and delivers said energy to said load circuit.

10. In combination, a first transformer having a magnetic core and a primary circuit and a secondary circuit, a load circuit connected to said secondary circuit, means for supplying magnetizing current to said primary circuit to store energy in said core by setting up magnetic flux, a second transformer having a primary circuit and a secondary circuit, the secondary winding of said second transformer being effectively coupled in series with the secondary winding of said first transformer, a condenser, means for charging said condenser, means for discharging said condenser for supplying a pulse of current to said second transformer to set up an auxiliary magnetomotive force in said first transformer for maintaining said flux and simultaneously cutting off said magnetizing current, and means for establishing a low impedance shunt circuit across said second transformer upon substantial discharge of said condenser.

11. A welding system comprising a welding load circuit, electrostatic energy storage means, magnetic energy storage means, means for independently storing energy in each of said storage means, means to deliver the energy stored in said condenser to said load circuit, and means to subsequently deliver the energy stored in said magnetic energy storage means to said load circuit, said energy delivering means operating in such close sequence as to deliver a single pulse of welding current to said load circuit.

12. In combination, a transformer having a magnetic core and a primary circuit and a secondary circuit, means for establishing a flow of current in said primary circuit for storing magnetic energy in said core, and means for supplying current to said secondary circuit for causing said flow of current to cease in said primary circuit.

13. In combination, a transformer having a magnetic core and a primary circuit and a secondary circuit, means for establishing a flow of current in said primary circuit for storing magnetic energy in said core, a discharge tube in series in said primary circuit, said tube being of the type in which the discharge must be restarted by a control means upon stoppage of the discharge, and means for supplying current to said secondary circuit for causing said flow of current to cease in said primary circuit and stop the discharge in said tube.

14. A resistance welding system comprising a resistance welding load circuit having electrode means to which current is supplied only after said electrode means are in contact with the work to be welded, electrostatic energy storage means, magnetic energy storage means, means for independently storing energy in each of said storage means, and means to deliver the energy stored in both of said energy storage means to said load circuit to supply a single pulse of welding current.

15. In combination, an inductance, means for supplying a magnetomotive force thereto to set up a magnetic flux, an inductive load circuit coupled with said inductance, means for establishing in said load circuit a current supplying a separate magnetomotive force to said inductance at least substantially equal to said first magnetomotive force, and means for interrupting said first magnetomotive force when said second magnetomotive force is supplied to said inductance.

16. In combination, an inductance, means for supplying a magnetomotive force thereto to set up a magnetic flux, an inductive load circuit coupled with said inductance, means for establishing in said load circuit a current supplying a separate magnetomotive force to said inductance at least substantially equal to said first magnetomotive force, and means responsive to said second magnetomotive force for interrupting said first magnetomotive force.

17. In combination, an inductance, means for supplying a magnetomotive force thereto to set up a magnetic flux, an inductive load circuit coupled with said inductance, means for establishing in said load circuit a current supplying a separate magnetomotive force to said inductance at least substantially equal to said first magnetomotive force, and means for interrupting said first magnetomotive force when said second magnetomotive force is supplied to said inductance.

18. In combination, an inductance, means for supplying a magnetomotive force thereto to store energy in said inductance by setting up a magnetic flux, electrostatic energy storage means, a load circuit operatively related to said inductance, said electrostatic energy storage means being operatively related to said inductance to supply a separate magnetomotive force thereto upon discharge of said electrostatic energy storage means, said inductance being designed and adapted to store substantially all of the energy to be consumed in said load circuit, means for cutting off said first magnetomotive force when said second magnetomotive force is supplied to said inductance, said electrostatic energy storage means being designed and adapted to store substantially only enough energy to cause said second magnetomotive force to be substantially equal to said first magnetomotive force.

19. In combination, a network comprising a source of alternating current, a load circuit, and means connected to said load circuit and comprising an inductance, rectifying means for transmitting current from said source to said inductance, and means for interrupting the flow of current through said inductance to transfer at least a portion of the stored electromagnetic energy of said inductance to said load circuit and comprising a capacitance, means for charging said capacitance, and means for connecting said capacitance in said network to interrupt the flow of current through said inductance.

20. In combination, an alternating current supply circuit, a load circuit, an inductance connected to said load circuit, electric translating apparatus for transmitting unidirectional current to said inductance and comprising electric valve means connected to said inductance, commutating means for rendering said electric valve means non-conducting and for effecting interruption of the current through said inductance to effect transfer of at least a portion of the energy stored in said inductance to said load circuit and comprisinng a capacitance which produces a commutating voltage, charging means for said capacitance, and means for preventing operation of said charging means during the commutation operation.

21. In combination, an alternating current supply circuit, a load circuit, an inductance connected to said load circuit, electric translating apparatus for transmitting unidirectional current to said inductance and comprising electric valve means connected to said inductance, commutating means for rendering said electric valve means non-conducting and for effecting interruption of the current through said inductance to effect transfer of at least a portion of the energy stored in said inductance to said load circuit and comprising a capacitance for producing a commutating voltage, a charging means for said capacitance, means for preventing operation of said charging means during commutation operation, and reset means for rendering said charging circuit operative.

22. In combination, an alternating current supply circuit, an inductance, a load circuit connected to said inductance, electric translating apparatus energized from said supply circuit and including electric valve means for transmitting unidirectional current to said inductance, means for interrupting the current through said inductance, means for reducing the magnitude of the impedance connected to said inductance upon the interruption of the current, and means proportional to the magnitude and the polarity of the voltage appearing across said inductance for initiating operation of the impedance reducing means.

23. For use in supplying a load from a source of potential, the combination comprising electric discharge valve means of the arc-like type connected between said source and load, means for initiating a flow of current through said valve means, an auxiliary source of blocking potential, means for connecting said auxiliary source in circuit with said valve means, the magnitude of the blocking potential available from said auxiliary source being sufficient to interrupt the flow of current through said valve means, and a potential absorbing element in circuit with said auxiliary source for rapidly reducing the magnitude of the blocking potential applied to said valve means in response to a flow of current from said auxiliary source to prevent backfiring of said valve means.

24. For use in supplying a load from a source of potential, the combination comprising electric discharge valve means of the arc-like type connected between said source and load, means for initiating a flow of current through said valve means, a capacitor, means for charging said capacitor, means for connecting said capacitor in circuit with said valve means after it is charged, the polarity and magnitude of the potential charge on said capacitor being such as to interrupt the flow of current through said valve means when the capacitor is so connected, and a potential absorbing element in circuit with said capacitor for rapidly reducing the magnitude of the potential applied from said capacitor to said valve means in response to a flow of current from said capacitor to prevent backfiring of said valve means.

25. For use in welding a material from a source of direct current, the system comprising a work circuit including said material, reactive means in inductive relationship with said work circuit, means for supplying direct current from said source through said reactive means, means for interrupting the supply of current from said source through said reactive means and electric discharge valve means in circuit in the system for conducting current produced by the decay of flux in said reactive means when the current flow therethrough is interrupted.

26. For use in welding a material from a source of direct current, the system comprising a welding transformer having a primary and a secondary, said secondary being in circuit with said material, means for supplying direct current from said source through said primary, means for interrupting the supply of current from said source through said primary and electric discharge valve means in circuit in the system for conducting current produced by the decay of flux in said transformer when the current flow therethrough is interrupted.

27. For use in supplying energy to a work circuit from a source of direct current, the system comprising reactive means in inductive relationship with said work circuit, means for supplying direct current from said source through said reactive means, means for supplying a unidirectional voltage to said reactive means in opposition to the voltage of said source for interrupting the supply of current from said source through said reactive means and electric discharge valve means in circuit in the system for conducting current produced by the decay of the flux in said reactive means when the current flow therethrough is interrupted.

28. For use in supplying energy to a work circuit from a source of direct current, the system comprising a transformer having a primary and a secondary, said secondary being in said work circuit, means for supplying direct current from said source through said primary, means for supplying a unidirectional voltage to said transformer in opposition to the voltage of said source for interrupting the supply of current from said source through said primary and electric discharge valve means in circuit in the system for conducting current produced by the decay of flux in said transformer when the current flow therethrough is interrupted.

29. For use in supplying a load from a source of potential, the system comprising electric discharge valve means of the arc-like type connected between said source and load, means for initiating a flow of current through said valve means, an auxiliary source of blocking potential, means for connecting said auxiliary source in circuit in the system, the magnitude of the blocking potential available from said auxiliary source being sufficient to interrupt the flow of current through said valve means, and a potential absorbing element in circuit in the system for rapidly reducing the magnitude of the blocking potential applied to said valve means in response to a flow of current from said auxiliary source to prevent backfiring of said valve means.

30. For use in supplying a load from a source of potential, the system comprising electric discharge valve means of the arc-like type connected between said source and load, means for initiating a flow of current through said valve means, a capacitor, means for charging said capacitor, means for connecting said capacitor in circuit in the system after it is charged, the polarity and magnitude of the potential charge on said capacitor being such as to interrupt the flow of current through said valve means when the capacitor is so connected, and a potential absorbing element in circuit in the system for rapidly reducing the magnitude of the potential applied from said capacitor to said valve means in response to a flow of current from said capacitor to prevent backfiring of said valve means.

JOHN W. DAWSON.

REFERENCES CITED

The following references are of record in the file of this patent:

UNITED STATES PATENTS

| Number | Name | Date |
| --- | --- | --- |
| Re. 22,314 | Dawson | May 18, 1943 |
| 1,299,150 | Dyer | Apr. 1, 1919 |
| 1,358,428 | Enger | Nov. 9, 1920 |
| 1,373,054 | Chubb | Mar. 29, 1921 |
| 1,478,302 | Snodgrass et al. | Dec. 18, 1923 |
| 1,972,529 | Longoria | Sept. 4, 1934 |
| 2,089,213 | Labadie | Aug. 10, 1937 |
| 2,159,916 | Vang | May 23, 1939 |
| 2,184,628 | Watson et al. | Dec. 26, 1939 |

FOREIGN PATENTS

| Number | Country | Date |
| --- | --- | --- |
| 474,553 | Great Britain | Nov. 3, 1937 |
| 773,888 | France | Sept. 10, 1934 |